April 23, 1935. C. D. FAGAN 1,998,495

LIQUID FLOW INDICATOR

Filed Oct. 4, 1932

INVENTOR-
Charles D. Fagan
BY Ramsey & Kent
his ATTORNEYS

Patented Apr. 23, 1935

1,998,495

UNITED STATES PATENT OFFICE 1,998,495

LIQUID FLOW INDICATOR

Charles D. Fagan, Sharon, Pa., assignor to Sharpsville Boiler Works Co., Sharpsville, Pa., a corporation of Pennsylvania Application October 4, 1932, Serial No. 636,120

7 Claims. (Cl. 116—117)

The present invention relates broadly to liquid flow indicators and more especially to a device for use with gasoline dispensing stations.

Gasoline and other liquids usually carry a small content of entrapped air. There is a tendency of the entrapped air to accumulate in any pocket which may occur in the liquid flow line.

In a flow indicator with the transparent portion of the indicator comprising a chamber located at one side of the line of flow of the liquid, there is a tendency for entrapped air in the liquid to become released from the liquid and to accumulate in the transparent chamber carrying the flow indicating symbol. This entrapped air is undesirable for several reasons, one being that it conveys the impression that full flow of liquid is not passing through the dispensing conduits and another reason being that the entrapped air may somewhat interfere with the proper operation of the indicator. Furthermore, it has become the custom of gasoline manufacturers to color their product and customers are accustomed to see the colored product in the flow indicator. If the entrapped air substantially fills the flow indicator, the liquid is not readily visible and the customer is not assured of the particular product purchased. Entrapped air in a flow indicator is also undesirable for other reasons.

During the use of flow indicators, the glass side walls are very liable to become coated with material which interferes with the visibility of the device and it is necessary occasionally to open the flow indicator to clean the glass. It is essential that all of the joints around the glass wall shall be very tight because it ocasionally happens that very substantial pressures develop within the flow indicator due to the fact that the dispensing hose may be completely filled with gasoline which tends to expand when the hot sun rays fall upon the hose, and, therefore, leakage will occur at the joints around the glass unless these joints are maintained thoroughly packed with gasket material. The present invention overcomes this difficulty by providing a top frame member which permanently supports the glass side walls and a separate removable top cooperating with the top frame member to permit the opening of a single joint to reach the interior mechanism and the inside of the glass walls for cleaning.

The present invention therefore overcomes the difficulties of the known art by providing a construction in which entrapped air cannot accumulate and also by providing a construction which may be easily opened for cleaning without disassembly of a number of sealed joints.

The present invention may be carried out in various structures, but the preferred form comprises the provision of a removable top carrying the top bearing for a vertical shaft of the indicator symbol and wherein the vertical shaft comprises a tubular member with one end terminating above the line of vision through the transparent chamber and the other end terminating in the line of flow of the gasoline in such manner as to provide an aspirating action through the tubular member which at all times withdraws the fluids from the upper end of the transparent chamber whereby the entrapment of air in the transparent chamber is completely avoided.

It is realized that the present invention may be carried out by structures other than those specifically disclosed herewith, and, therefore, the present disclosure is to be understood as illustrative and not in the limiting sense.

Figure 1:
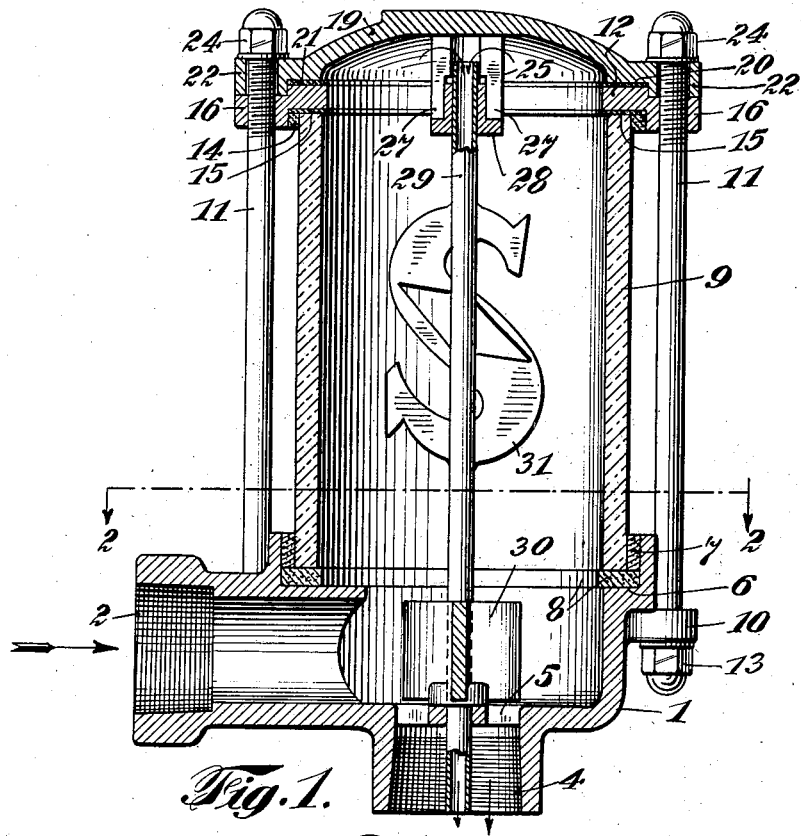
Fig. 1 is a view showing a sectional elevation of the preferred device taken on line 1—1 of Fig. 2.
Figure 2:
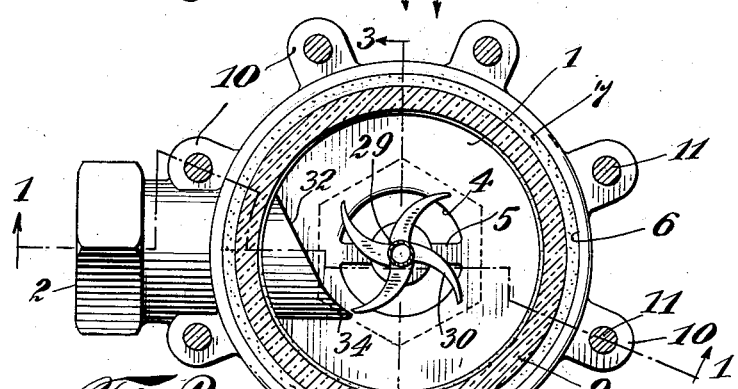
Fig. 2 is a view showing a section of the device in plan taken on line 2—2 of Fig. 1.
Figure 3:
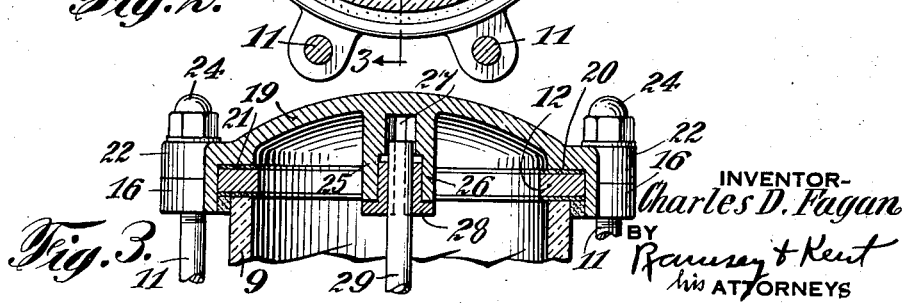
Fig. 3 is a detail of the top of the device taken on line 3—3 of Fig. 2.

The device in the preferred form comprises a base member 1 having an inlet conduit 2 and an outlet conduit 4 with the axis of the inlet conduit 2 and the outlet conduit 4 being arranged at substantially right angles to each other. A bearing bar 5 extends across the outlet conduit 4 to comprise a bearing and support member. The base member 1 is provided with an annular circular seat 6 which carries gaskets 7 and 8 to seal the lower end of a cylindrical glass member 9 comprising the side walls of a transparent chamber. The base member 1 is also provided with radial arms 10 for assembly rods 11.

A top frame 12, comprising in the preferred form an annular ring, sets over the cylindrical glass member 9 and carries gaskets 14 and 15 which tightly seal the upper end of the glass cylinder 9. This annular ring 12 is provided with radial arms 16 that are screw threaded to the assembly rods 11 in such manner that by tightening the nuts 18 on the lower end of the tension rods 11, the annular top frame 12 is tightly clamped against the gaskets 14 and 15 on the upper end of the glass cylinder 9 and thereby forms a hermetic seal for the upper end of the glass side wall as well as to form a hermetic seal at the bottom of the glass cylinder with the gaskets 6 and 7. A top member 19 is provided with a sealing surface 20 to clamp a gasket 21 between the top member 19 and the annular ring 12 to seal this joint. This top member 19 is provided with radial arms 22 which are not screw threaded and through which the tension rods 11 slideably extend. Cap nuts 24 are adapted to cooperate with the threaded upper ends of the tension rods 11 to clamp the top 19 into position and to compress the gasket 21.

The top 19 is preferably dome shaped and is provided with a pair of depending socket members 25 and 26 separated by a cross slot 27 forming an inlet passageway. These socket members 25 and 26 carry a bearing bushing 28. An indicator shaft 29 is mounted to rotate in the bearing bar 5 at the lower end and in the bearing 28 at the upper end. This indicator shaft is hollow with the lower end terminating a substantial distance below the bearing bar 5 and in the axis of the outlet opening 4 so that liquid flowing through the outlet opening 4 past the lower end of the indicator shaft produces an aspirating or suction action tending to produce a flow of liquid through the shaft whereby fluid from beneath the domed top is drawn in through the cross slot 27 and out through the lower end of the indicator shaft. In this way, a flow of fluid is provided from the uppermost portion of the sealed chamber, and consequently, any air entrapped beneath the domed top 19 is withdrawn from the device so that the device is always filled with liquid.

The lower end of the indicator shaft 29 adjacent the inlet conduit 2 and directly over the outlet conduit 4 is provided with a rotor 30 having curved blades constructed in such manner as to rotate the indicator shaft and thereby rotate the indicator symbol 31, so that when liquid is flowing through the inlet and outlet conduits, the symbol 31 rotates and is visible in the submerged liquid through the glass side walls 9. To further facilitate the rotation of the device, the inlet conduit terminates in a bevelled end 32, a slight portion of which at 34 is closely adjacent the path of the curved blades on the rotor 30, while the remaining portion of the bevelled end is spaced from the rotor. In this manner, rotation of the rotor 30 is assured. The upper part of the rotor and also the free portion of the bevelled end 32 of the inlet conduit 2 is open to the transparent sealed chamber carrying the symbol so that liquid freely flows into this chamber and out of the outlet conduit 4.

From the foregoing, it will be observed that during the operation of the device, the sealed chamber is always completely filled with liquid and the difficulties of the known art are overcome. Furthermore, the conditions of pressure within the sealed transparent chamber are substantially uniform around the indicator symbol 31 which preferably comprises a flat member acting not only as an indicator but as a dampener which tends to stabilize the speed of rotation of the indicator. This uniform action is due to the fact that the outlet through which the entrapped air flows from the device is centrally located relative to the axis of rotation of the symbol.

It will also appear that the domed top member may be removed by removing the top cap nuts without disturbing the seal between the annular ring top frame and the cylindrical glass. This removal of the top member loosens but a single joint and permits the operator to remove the rotating symbol and operating parts for cleaning or repair and renders the side walls capable of being easily cleaned without danger of loosening up a number of joints which are difficult to repack to form hermetic seals.

What I claim is:

1. A flow indicator comprising an inlet conduit, an outlet conduit, a substantially vertical sealed transparent chamber extending from said inlet and outlet conduits, a hollow indicator shaft extending through said chamber, means to rotate said indicator shaft, an indicator on said shaft, the lower end of said hollow indicator shaft extending into the outlet conduit, and means to admit fluid to the upper end of said hollow indicator shaft.

2. A liquid flow indicator comprising a housing having an upper head, a lower head and cylindrical glass body interposed therebetween, bolt means connecting the heads to retain the housing in assembled relation, input and output conduits communicating with the interior of the housing, a rotor positioned within the glass body, means in the housing for mounting the rotor for rotating movement, and a removable portion on one of said heads, whereby said rotor and mounting means are removable through the opening formed thereby without disturbing said bolt means.

3. A flow indicator comprising a transparent chamber, conduit means for a flow of liquid into and out of said chamber, a hollow indicator shaft extending through said chamber, an indicator fixedly mounted on said shaft, and driving means to rotate said shaft located in the line of flow of liquid through said conduit means, the open upper end of said shaft being located in the upper end of said transparent chamber and the lower open end of said shaft being located within the line of flow of liquid through said conduit means to cause an aspirating action effective to withdraw fluid from the upper end of said chamber.

4. A flow indicator comprising a base frame member, a top frame member, a transparent member sealed to said base member and to said top frame member to form a transparent chamber, a rotatable hollow shaft extending through said transparent chamber, a flow indicator fixedly mounted on said shaft to be visible through said transparent member, conduit means to permit the flow of liquid through said transparent chamber, driving means fixed to said shaft and operated by said flow of liquid to rotate said shaft, a removable top hermetically sealed to said top frame member to facilitate access to said transparent chamber while retaining said transparent member sealed to said top frame and to said base member, and a bearing for the upper end of said shaft being carried by said removable top.

5. A flow indicator comprising a base frame having an annular seat thereon, a transparent cylindrical side wall member sealed on said annular seat, an annular top frame having an annular seat thereon sealed to the upper end of said cylindrical side wall member to form a sealed transparent chamber, a rotatable shaft extending lengthwise of said transparent chamber, an indicator fixedly mounted on said shaft, conduit means to permit the flow of liquid through said transparent chamber, driving means fixedly mounted on said shaft and adapted to be operated by said flow of liquid to rotate said shaft, a removable top member seated upon and sealed to said annular top frame to permit access to the interior of said chamber while retaining said transparent member sealed to said top frame and said base member.

6. A flow indicator comprising a base member, a transparent cylinder mounted on said base member, closure means for closing the upper end of said transparent cylinder, a rotatable hollow shaft, an indicator fixedly mounted upon said shaft and visible through said transparent cylinder, outlet conduit means provided in said base member with the axis thereof being substantially coincident with the axis of said shaft, inlet conduit means provided in said base and with the axis thereof at substantially right angles to the axis of the outlet means, driving means mounted on said shaft to rotate said shaft by flow of liquid through said conduit means, both ends of said shaft being open to liquid flowing through said transparent cylinder.

7. In a flow indicator, the combination of a sight bowl, means for passing liquid through said bowl, a trapped air relief disposed axially of said bowl and having a conduit therethrough, said conduit communicating with the top of said bowl and communicating at the bottom of said bowl with an air outlet, said trapped air relief comprising a hollow rotatable indicator shaft, an indicator mounted on said shaft, and means to rotate said indicator by liquid which is passed through a portion of said bowl.

CHARLES D. FAGAN.